July 21, 1953  G. NEMETZ  2,646,066
ONE-WAY VALVE, PARTICULARLY FOR LUBRICATING SYSTEMS
Filed July 29, 1947
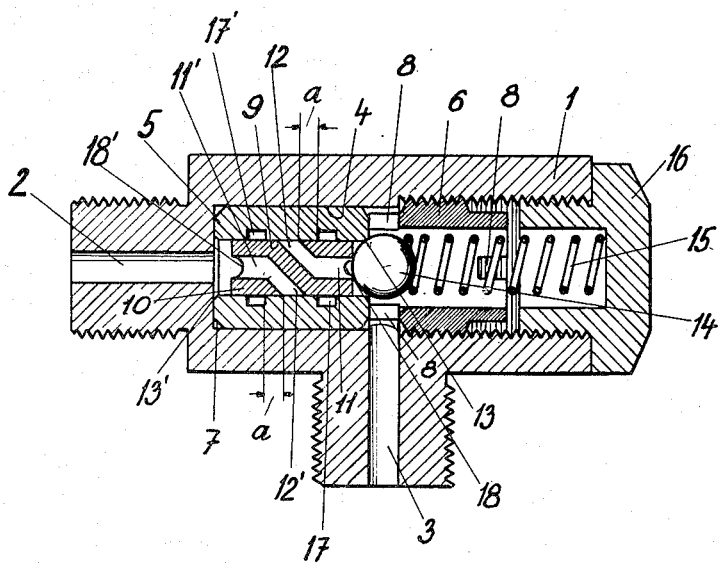
INVENTOR
GUSTAF NEMETZ, DECEASED
BY VALERIE NEMETZ, ADMINISTRATRIX.
BY
ATTORNEY Patented July 21, 1953

2,646,066

UNITED STATES PATENT OFFICE 2,646,066

ONE-WAY VALVE, PARTICULARLY FOR LUBRICATING SYSTEMS

Gustav Nemetz, deceased, late of Vienna, Austria, by Valerie Nemetz, administratrix, Vienna, Austria, assignor to Alex. Friedmann, Kommandit-Gesellschaft, Vienna, Austria Application July 29, 1947, Serial No. 764,526
In Germany April 24, 1944

Section 1, Public Law 690, August 8, 1946
Patent expires April 24, 1964

7 Claims. (Cl. 137—329)

This invention relates to one-way valves and particularly to valves which are suitable to be inserted in the pressure pipe lines of lubricating systems. It has been known heretofore to protect lubricating pumps from the back pressure by inserting in the pipe lines of the lubricating systems spring loaded one-way valves which open under the feeding pressure of the lubricant. As dirt and grit particles are liable to interfere with the proper seating of a valve and to affect its sealing action, it has already been proposed to provide an additional sealing means by a piston like extension projecting from that side of the valve which is nearer the lubricating pump into a bore or pipe forming the co-operating sealing surface, the arrangement being such that after a stroke of the piston of predetermined length the lubricant flows through longitudinal grooves provided in the piston surface to the seating of the valve. During the suction stroke of the lubricating pump the piston slides back and the passage through its grooves is closed again by the surface of the bore, before the valve is returned to its seating. In this manner two groups of co-operating sealing surfaces and a double closure of the pressure pipe line are afforded. The manufacture of such one-way valves, however, is difficult and necessitates tedious fitting operations.

This invention relates to a one-way valve of the type affording a double closure by two groups of co-operating sealing surfaces, namely a piston like member slidably arranged in a bore or pipe and a second, valve like member arranged to bed on to a co-operating seating. The invention essentially resides in the provision of the slidable piston like member and the seated valve like member as two separate parts which are arranged one behind the other in the direction of flow of the lubricant.

The provision of the two closure members as separate parts ensures a reliable sealing effect and greatly simplifies both the making and the fitting of the parts, as it is no longer necessary to adjust relatively to each other two different sealing surfaces of one and the same part. This simplification has advantages with regard to both the movable parts, which may comprise a cylindrical piston and a ball, and the co-operating stationary parts comprising for instance a bore or pipe and an annular seating, as these two groups of sealing surfaces need not be accurately co-axial.

In a preferred embodiment of the invention openings positioned diametrically opposite each other in the cylindrical surface of the piston and communicating each with one of the spaces in front and at the rear of the piston respectively, are provided to be connected with each other when the valve opens, e. g. via an annular groove in the surface of the bore co-operating with the piston like part. Preferably the piston like part is provided with two passages each connecting one of the end faces of the piston and one of the openings at diametrically opposite points of its cylindrical surface, so that in the closed position of the valve a leakage from one end of the piston to the other end is only possible via one of the said openings in the cylindrical surface of the piston to the annular groove in the co-operating guiding and sealing bore and from this groove to the other opening in the cylindrical surface of the piston. Thus, as will be shown in detail later, the length of the leakage path is twice that of the known construction of a piston with longitudinal grooves, and therefore the stroke of a valve according to the invention can be one half of that of a known construction of the same sealing effect.

Furthermore parts of a valve according to the invention can be shaped symmetrically and suited for assembly in one position or the other position inverted to the first so that less attention is required for the assembling operation which can be carried out more speedily.

An embodiment of the invention is shown in the drawing diagrammatically and by way of example.

The casing 1 comprises an inlet bore 2 into which the lubricant, coming for instance from a lubricating pump (not shown in the drawing) is pressed, and an outlet bore 3 from which the lubricant travels onto the point which is to be lubricated. A bore 4 co-axial with, but of greater diameter than the bore 2 accommodates a sleeve or bushing 5 which is securely held in position, a collar 6 mounted by screw thread engagement in the casing 1 pressing the sleeve against the end face 7 of the bore 4. The collar is symmetrical with respect to its middle plane, both ends of the collar being of reduced diameter, and suited to serve a double purpose namely to be engaged by a screw driver at one end when the valve is assembled, and to pass lubricant at the other end during the operation of the valve.

A bore 9 of the sleeve or bushing 5 and a piston 10 slidable in it form co-operating cylindrical sealing surfaces. Passages 11, 11' lead each from one end of the piston 10 to one of the lateral openings 12, 12' which are positioned in the centre section of the cylindrical surface of the piston, and diametrically opposite each other. The end faces of the piston are provided with radial notches 18, 18' respectively.

A movable valve member 14, preferably of ball shape, is arranged to bed on to a seating 13 formed on the end face of the sleeve or bushing 5, a suitable valve pressure being afforded by a spring 15 supported in a recess of a screw threaded cover 16 closing the end of the valve casing which is opposite the inlet bore. A seating 13' is provided at the other end of the sleeve 5 to make it symmetrical for the before mentioned purpose.

At a certain distance from the seating 13 an annular groove 17 in the cylindrical bore of the sleeve 5 is provided to serve as a communication between the openings 12, 12' of the piston when the valve opens. A similar groove 17' is arranged to ensure the symmetry of the sleeve or bushing 5 so that it can be correctly assembled in either position as the functions of the seating 13 and groove 17 will be carried out by the seating 13' and the groove 17' in case the sleeve is assembled in a position which is inverted as compared with the position shown in the drawing.

The operation is as follows: Lubricant under pressure entering the bore 2 causes the piston 10 to move towards the other end of the valve casing and thereby to lift the ball 14 from its seating. After a stroke of the piston of a predetermined length $a$ the openings 12, 12' communicate with each other through the groove 17 and the lubricant travels from passage 11' via opening 12', groove 17, opening 12, passage 11, through the notches 18 at the end face of the piston 10, past the seating 13 and ball 14, through the notches 8 of the screw threaded collar 6 to the outlet bore 3.

If the feeding pressure of the lubricant falls, a movement of the ball 14 and piston 10 in the opposite direction is caused by the spring 15 and back pressure of the lubricant, until the ball returns to its seating and the piston to its rest position shown in the drawing.

If by some deposit the ball 14 is prevented from being properly seated lubricant penetrates into the unavoidable clearance between the piston 10 and the bore 9. Such lubricant coming from the opening 12 however has to creep between the sealing surfaces over the length $a$ before it reaches the groove 17, and again over a similar length $a$ between the sealing surfaces, to reach the opening 12' and thereby the passage 11'. It will be seen that the length $a$ corresponds to the length of the piston stroke which determines the opening movement and that due to the symmetrical arrangement the distance between the groove 17 or 17' and opening 12 or 12' is $a$ so that the described functioning of the valve is secured even if the sleeve 5, or the piston 10, or both are inverted with respect to the shown positions, the shortest creeping distance being in any case twice the length of the piston stroke which opens the valve.

In this manner any flow of lubricant in the direction towards the lubricating pump is more effectively prevented than has been possible up to now whilst the before mentioned manufacturing difficulties are also overcome.

Having now particularly described and ascertained the nature of the invention, and in what manner the same is to be performed, what is desired to be claimed is:

1. A check valve comprising a housing having an inlet and an outlet, said housing having a passage formed therein, intermediate said inlet and outlet, a bushing in said passage, a valve seat formed in said bushing towards said outlet, a valve member resiliently held against said seat, a piston slidably disposed for actuation by fluid pressure from asid inlet and said outlet in said passage intermediate said inlet and said valve member substantially adjacent said member, a fluid flow path from said inlet to said seat through said passage controlled by said piston, said fluid flow path being formed in part by said bushing, and said piston comprising a passage means forming portions of said flow path, said fluid flow path portions in said piston comprising a passage each therein respectively extending from a first point of the lateral wall surface thereof to its inlet end and from a second point of the lateral wall surface diametrically opposite to the first point to its outlet end, and wherein said part of said fluid flow path in said bushing comprises an annular groove in said bushing forming a connection between said passages and said piston upon the piston being displaced toward the outlet.

2. A valve according to claim 1, wherein said bushing comprises a completely symmetrical formation, having a second annular groove arranged symmetrically with respect to said first-named groove and a valve seat being formed at each end of said bushing, whereby said bushing may be correctly assembled irrespective of its position.

3. A valve according to claim 1, further including a nipple in said housing for securing said bushing therein, said valve member being encased thereby, said nipple having radial slots in each of its ends, whereby the flow of fluid is facilitated from said bushing to said outlet and the manipulation thereof by means of a tool is made possible.

4. A check valve comprising a housing having an inlet and an outlet, a bushing disposed in said housing and having a cylindrical bore therein between said inlet and outlet, a piston valve slidably guided in said bore for controlling the fluid flow from said inlet to said outlet, a valve seat formed on the piston valve at the end that is nearest said outlet, a valve member separate from but in contact with said piston valve, resilient means urging said valve member against said seat, a fluid path from said inlet to said valve seat, a portion of said fluid path being provided by passageways in said bushing, and other portions of said fluid path being provided by passageways in said piston valve and terminating at said valve seat, the said portions in the said bushing and in the said piston valve coinciding when said piston valve is in open position and being otherwise out of communication with one another, said piston valve and valve member thus effecting a double sealing for the said fluid flow and being movable in one direction by the fluid pressure exerted at said inlet against the pressure of said resilient means into open position to permit fluid flow from said inlet to said outlet, and being movable in the opposite direction by the said resilient means to force the said valve member and piston valve into closed position.

5. A check valve comprising a housing having an inlet and an outlet, a bushing disposed in said housing and having a cylindrical bore therein between said inlet and outlet, a piston valve slidably guided in said bore for controlling the fluid flow from said inlet to said outlet, a valve seat formed on the piston valve at the end that is nearest said outlet, a ball separate from but in contact with said piston, resilient means urging said ball against said seat, a fluid path from said inlet to said valve seat, a portion of said fluid path being provided by passageways in said bushing, and other portions of said fluid path being provided by passageways in said piston valve and terminating at said valve seat, the said portions in the bushing and in the said piston valve coinciding when said piston valve is in open position, and being otherwise out of communication with one another, said piston valve and ball forming a double sealing for the said fluid flow and being movable in one direction by the fluid pressure exerted at said inlet against the pressure of the said resilient means into open position to permit fluid flow from said inlet to said outlet, and being movable in the opposite direction by the said resilient means to force the said valve member and piston valve into closed position.

6. A check valve comprising a housing having an inlet and an outlet, a bushing disposed in said housing and having a bore formed therein between said inlet and outlet, a piston valve slidable in said bore, a valve seat formed at the end of said piston valve nearest said outlet, a valve member resiliently held against said seat, and a fluid flow path from said inlet to said valve seat through said bore and said piston, said fluid flow path comprising passageways in said piston extending respectively from a first point of the lateral wall surface thereof to its inlet end and from a second point of the lateral wall surface diametrically opposite to the first point to said valve seat at its outlet end, and an annular groove in the wall of said bore forming a connection between said passageways in said piston when the piston is moved toward the outlet to a position in which the ends of said passageways opening in the lateral wall surface of the piston communicate with said annular groove, said piston being movable toward the inlet to a position in which said passageways and groove are out of communication.

7. A check valve according to claim 4, in which said bushing is symmetrical about its central transverse plane, opposite ends of said bushing being alike.

VALERIE NEMETZ,

*Administratrix of the estate of Gustav Nemetz, deceased.*

References Cited in the file of this patent

UNITED STATES PATENTS

| Number | Name | Date |
|---|---|---|
| 583,037 | Dunham | May 25, 1897 |
| 1,707,259 | Farmer | Apr. 2, 1929 |
| 1,818,392 | Hans | Aug. 11, 1931 |
| 1,819,672 | Cain | Aug. 18, 1931 |
| 1,960,271 | Lovekin | May 29, 1934 |
| 2,013,860 | McElwaine | Sept. 10, 1935 |
| 2,132,028 | Gunderson | Oct. 4, 1938 |
| 2,200,830 | Beharrell | May 14, 1940 |

FOREIGN PATENTS

| Number | Country | Date |
|---|---|---|
| 322,550 | Germany | of 1920 |